United States Patent [19]

Marrion

[11] Patent Number: 5,124,176
[45] Date of Patent: Jun. 23, 1992

[54] POWDER COATING COMPOSITIONS

[75] Inventor: Alastair R. Marrion, Earsdon Moor, United Kingdom

[73] Assignee: International Paint public limited company, United Kingdom

[21] Appl. No.: 347,149

[22] Filed: May 3, 1989

Related U.S. Application Data

[62] Division of Ser. No. 885,831, Jul. 14, 1986, Pat. No. 4,861,841.

[30] Foreign Application Priority Data

Jul. 17, 1985 [GB] United Kingdom ................ 8517972

[51] Int. Cl.$^5$ ................ C09D 135/00; C09D 135/02; C09D 133/14; C09D 167/02
[52] U.S. Cl. .................... 427/195; 427/375; 525/113; 525/172; 525/175; 525/176; 525/207; 525/217; 525/218; 525/223; 525/448
[58] Field of Search ............... 525/207, 217, 218, 223, 525/172, 175, 176, 113, 448; 427/375, 195

[56] References Cited

U.S. PATENT DOCUMENTS

| | | | |
|---|---|---|---|
| 3,845,016 | 10/1974 | Labana et al. | 260/42.18 |
| 3,919,347 | 11/1975 | Katsimbas | 260/836 |
| 3,939,127 | 2/1976 | Labana et al. | 260/78.4 |
| 3,954,898 | 5/1976 | Hirota et al. | 260/837 |
| 3,959,405 | 5/1976 | Labana et al. | 260/836 |
| 3,975,456 | 8/1976 | Labana et al. | 260/836 |
| 3,991,132 | 11/1976 | Siwiec et al. | 260/836 |
| 4,065,518 | 12/1977 | Labana et al. | 260/836 |
| 4,069,275 | 1/1978 | Labana et al. | 260/836 |
| 4,091,048 | 5/1978 | Labana et al. | 260/836 |
| 4,092,373 | 5/1978 | Siwiec et al. | 260/830 |
| 4,101,606 | 7/1978 | Cenci et al. | 260/857 |
| 4,115,637 | 9/1978 | Cenci et al. | 526/56 |
| 4,182,840 | 1/1980 | Meyer et al. | 525/437 |
| 4,211,691 | 7/1980 | FitzGerald et al. | 260/42.21 |
| 4,284,745 | 8/1981 | Meyer et al. | 525/408 |
| 4,308,188 | 12/1981 | Wicks et al. | 260/29.6 |
| 4,452,948 | 6/1984 | Marrion et al. | 525/207 |
| 4,565,852 | 1/1986 | Qaderi | 525/528 |
| 4,650,834 | 3/1987 | Yagishita et al. | 525/386 |

FOREIGN PATENT DOCUMENTS 0073022 8/1982 European Pat. Off. .
1366081 9/1974 United Kingdom .
1561828 3/1984 United Kingdom .

Primary Examiner—James J. Seidleck
Assistant Examiner—David Buttner
Attorney, Agent, or Firm—Eckert Seamans Cherin & Mellott

[57] ABSTRACT

A powder coating composition comprises a component (A) containing carboxylic acid or anhydride functionality and a component (B) containing hydroxy functionality. The components (A) and (B) are both solids at temperatures up to 50° C. and at least one of them is a synthetic resin having a glass transition temperature in the range 0° to 120° C. The carboxylic acid or anhydride-functional component (A) is a compound or polymer containing at least two cyclic carboxylic anhydride groups per molecule or is a compound containing a moiety of the formula:

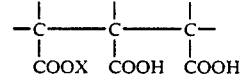

where X is a hydrogen atom or an alkyl group, or a cyclic anhydride thereof. The hydroxy-functional component (B) contains at least two hydroxy groups per molecule and contains at least one amine group in its molecule to catalyze the reaction of the carboxylic acid or anhydride groups of component (A) with the hydroxy groups of component (B). The composition is prepared by mixing the ingredients, extruding them at a temperature above the glass transition temperature of at least one of the components but below the fusion temperature, and comminuting the extrudate. The composition is applied to substrates and heated to cause fusion and reaction of the ingredients to cure the coating layer formed.

21 Claims, No Drawings

POWDER COATING COMPOSITIONS

This is a division, of application Ser. No. 885,831 filed Jul. 14, 1986, now U.S. Pat. No. 4,861,841.

This invention relates to thermosetting powder coating compositions. Such a coating composition comprises powdered solid materials containing groups capable of reacting with each other when heated. The coating composition is applied to a substrate, particularly a metallic substrate, in powder form, usually by electrostatic spraying. The coating composition is heated on the substrate to fuse at least the major component of the coating to cause it to flow and to react with another component to cure the coating.

Examples of powder coating compositions comprising a component containing hydroxyl groups and a component containing anhydride groups are described in U.S. Pat. Nos. 4,069,275 and 4,101,606, British Patents 1366081 and 1561828 and European Patent Application 73022. Such powder coatings are generally heat-cured at a temperature in the range from 130° to 200° C. The use of an amine catalyst for the curing reaction between the hydroxyl and anhydride groups is described in U.S. Pat. No. 4,069,275. The amine catalyst is generally a solid of melting point 50° to 200° C. which is mixed into the powder coating composition.

Examples of liquid coating compositions comprising a component containing hydroxyl and amine groups and a component containing anhydride groups are described in U.S. Pat. No. 4,452,948, which relates to a two-pack solvent-based coating composition, and U.S. Pat. No. 4,308,188, which relates to water-borne coatings comprising the half-ester zwitterion reaction product of a polymer containing cyclic acid anhydride groups with a hydroxy-functional tertiary carbinamine.

A powder coating composition according to the invention comprises a component (A) containing carboxylic acid or anhydride functionality and a component (B) containing hydroxy functionality, the components (A) and (B) both being solids at temperatures up to 50° C. and at least one of (A) and (B) being a synthetic resin having a glass transition temperature (Tg) in the range 0°–120° C., and the composition is characterised in that:

the carboxylic acid or anhydride-functional component (A) is a compound or polymer containing at least two cyclic carboxylic anhydride groups per molecule or is a compound containing a moiety of the formula:

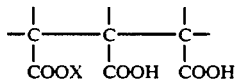

where X is a hydrogen atom or an alkyl group, or a cyclic anhydride thereof, provided that the carboxylic acid or anhydride-functional component (A) does not contain an olefinic double bond in the alpha, beta- or beta, gamma-position with respect to any carboxylic acid or anhydride group and provided that if the component (A) is an addition polymer the carboxylic acid or anhydride groups are separated from the addition polymer chain by at least one intervening carbon atom, and the hydroxy-functional component (B) contains at least two hydroxy groups per molecule and contains at least one amine group in its molecule to catalyse the reaction of the carboxylic acid or anhydride groups of component (A) with the hydroxy groups of component (B).

Examples of synthetic resins of Tg 0°–120° C. suitable for use as anhydride component (A) include anhydride-functional polymers formed by the reaction of a hydroxy-functional polymer with a tricarboxylic compound capable of introducing anhydride groups. Preferred tricarboxylic compounds are those containing a moiety of the formula:

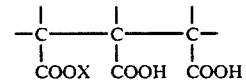

where X is an alkyl group of 1 to 4 carbon atoms or especially a hydrogen atom, or a cyclic anhydride thereof. Anhydrides are generally preferred to the corresponding acids since the reaction may require less heating and produce higher yields. A particularly preferred anhydride is tricarballylic anhydride of the formula

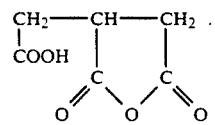

Tricarballylic acid,

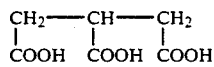

is also effective to introduce anhydride groups on heating, as is citric acid. Hemimellitic anhydride (benzene 1,2,3-tricarboxylic acid anhydride) or acid can also be used, although the aliphatic compounds are preferred. Alicyclic compounds can also be used, for example anhydrides of cyclohexane-1,2,3-tricarboxylic acid and derivatives thereof substituted by an alkyl group. An alicyclic tricarboxylic acid anhydride can be formed by the Diels-Alder reaction of a 2,4-dienoic acid such as sorbic acid with maleic anhydride according to the formula:

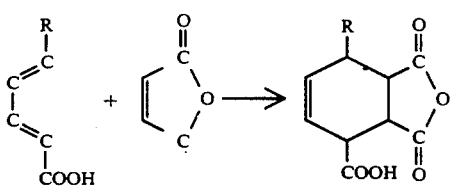

where R is hydrogen or an alkyl group (R is methyl when the dienoic acid is sorbic acid). The cyclohexene tricarboxylic acid anhydride produced can be hydrogenated to form cyclohexane-1,2,3-tricarboxylic acid anhydride which is reacted with a hydroxy-functional polymer to produce an anhydride-functional component (A) for use in a powder coating composition according to the invention.

Anhydride-functional polymers of Tg 0°–120° C. can also be produced by the reaction of a hydroxy-functional polymer with trimellitic anhydride acid chloride in the presence of a tertiary base; by transacidolysis of the acetate of a hydroxy-functional polymer with trimellitic anhydride; or by thermal esterification of the hydroxy-functional polymer with trimellitic anhydride. These three reactions are described by Puskas and Fields in Ind. Eng. Chem. Prod. Res. Develop., Volume 9, No. 3 (1970) at page 403-407. The thermal esterification of hydroxy-functional polymers with trimellitic anhydride is also described in European Patent Application 73022. These anhydride-functional polymers can be used as component (A) in the powder coating compositions of the present invention. The reaction products of hydroxy-functional polymers with aliphatic or alicyclic tricarboxylic compounds such as tricarballylic anhydride or acid are however preferred since the reaction with such a compound converts a substantially greater proportion of the hydroxy groups to anhydride groups compared to reaction with trimellitic anhydride. Moreover, reaction with an aliphatic or alicyclic tricarboxylic anhydride can be carried out at lower temperatures and can form an anhydride-functional polymer from a hydroxy-functional polymer with a smaller increase in molecular weight and less colour in the product than is the case with reaction with trimellitic anhydride.

The anhydride component (A) may be an anhydride-tipped polymer of Tg 0°-120° C. formed by the reaction of a tricarboxylic compound capable of introducing anhydride groups with a hydroxy-tipped polymer, for example a hydroxy-tipped polyester. Such polyesters can be prepared by the reaction of an excess of one or more glycols with one or more polycarboxylic acids or anhydrides. The glycol and polycarboxylic acid or anhydride reagents used in preparing the polyester can be those known for preparing polyesters for powder coatings. The glycol component preferably consists at least partly of a branched-chain glycol such as neopentyl glycol or trimethylpentane diol, optionally with ethylene glycol or propylene glycol. The polycarboxylic acid or anhydride component preferably consists at least partially of an aromatic acid or anhydride such as isophthalic acid, terephthalic acid or phthalic acid or anhydride, or an alicyclic acid or anhydride such as cyclohexane dicarboxylic acid, optionally with an aliphatic dicarboxylic acid such as adipic acid. The polyester-forming reagents preferably include a minor amount of a trifunctional reagent such as trimethylolpropane or trimellitic anhydride to increase the average functionality of the polyester and to introduce branching. Such anhydride-tipped polyesters can be used in the coating composition with synthetic resins containing hydroxy and amine groups or with lower molecular weight crystalline compounds containing at least two hydroxy groups and at least one amine group.

The anhydride component (A) can alternatively be an anhydride-functional polymer of Tg 0°-120° C. formed by the reaction of a tricarboxylic compound capable of introducing anhydride groups with an addition copolymer having pendent hydroxyl groups, for example a copolymer of a hydroxyalkyl ester of an olefinically unsaturated acid such as hydroxyethyl methacrylate, hydroxyethyl acrylate, hydroxypropyl acrylate or hydroxypropyl methacrylate. The addition copolymer preferably contains 10 to 50 percent by weight hydroxyalkyl acrylate or methacrylate units together with comonomer units of one or more esters of methacrylic or acrylic acid such as methyl methacrylate, ethyl methacrylate or ethyl acrylate and/or styrene. An alternative type of addition copolymer having pendent hydroxyl groups is a styrene/allyl alcohol copolymer.

Alternative hydroxy-functional polymers which can be reached with a tricarboxylic compound such as tricarballylic anhydride to form an anhydride-functional component (A) are hydrolysed epoxy resins, hydroxy-functional polyurethanes and hydroxy-functional polycarbonates.

A hydroxy-functional polymer which is reacted with a tricarboxylic compound capable of introducing anhydride groups to form component (A) preferably contains no amine groups so that anhydride groups can be introduced into the polymer without premature curing.

We have found that addition polymers in which a carboxylic acid anhydride group is immediately adjacent the addition polymer chain, for example polymers of an alpha, beta-unsaturated carboxylic acid anhydride such as the maleic anhydride copolymers described in British Patent 1366081 and U.S. Pat. Nos. 4,069,275 and 4,101,606 and the itaconic anhydride copolymers described in U.S. Pat. No. 4,452,948, as well as materials in which an olefinic double bond is present in the alpha, beta- or beta, gamma-position with respect to any carboxylic acid or anhydride group, are not suitable for forming the powder coating compositions of the invention. They lead to a rough, brittle and sometimes foamed product on heat curing. We believe that this may be caused by decarboxylation of the polymers, giving off gas during curing.

The anhydride component (A) may be an addition polymer of Tg 0°-120° C. of a cyclic carboxylic anhydride in which the anhydride groups are separated from the addition polymer chain by at least one intervening carbon atom. Examples of suitable anhydride monomers are vinyl trimellitate anhydride whose preparation is described in U.S. Pat. No. 4,308,188, a vinyl ester of an acylated citric acid anhydride as described in European Patedt Application 85884, or a compound of the formula:

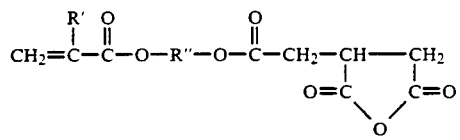

where R' represents hydrogen or methyl and R" represents an alkylene group having 2 to 4 carbon atoms which can be prepared by the reaction of a hydroxyalkyl acrylate or methacrylate with tricarballylic anhydride.

The anhydride component (A) can alternatively be a polymer of Tg 0°-120° C. containing cyclic carboxylic anhydride groups introduced by the ene reaction. Such polymers are the reaction product of a polymer containing residual unsaturation, for example an unsaturated polyester, with an olefinically unsaturated cyclic carboxylic anhydride, for example maleic anhydride.

When the hydroxy-functional component (B) is a synthetic resin of Tg 0°-120° C. the component (A) can be a tricarboxylic compound containing a moiety of the formula:

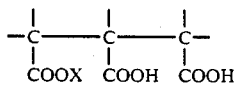

or a cyclic anhydride thereof. The tricarboxylic compound is preferably an anhydride. Tricarballylic anhydride is the preferred anhydride and is capable of producing particularly smooth hard glossy cured films when used in a powder coating with a hydroxy-functional polymer (B), for example an acrylic polymer containing hydroxy and amine groups. Tricarballylic acid can also be used, as can tricarballylic anhydride in which the free carboxyl group is esterified with an alkanol, e.g. of up to 4 carbon atoms.

Alternative low molecular weight anhydride components (A) which can be used in the powder coating composition with a synthetic resin (B) of Tg 0°–120° C. containing hydroxy and amine groups are oligomers of trimellitic anhydride containing at least two anhydride groups such as those described in British Patent 1561828 and aromatic dianhydrides such as benzophenone tetracarboxylic dianhydride.

When component (B) is a synthetic resin of Tg 0°–120° C. the component (A) can be a mixture of a polymer containing cyclic anhydride groups and a tricarboxylic compound containing a moiety of the formula:

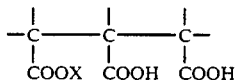

or a cyclic anhydride thereof. Such a mixture can be formed by reacting a hydroxy-functional polymer with a stoichiometric excess of the tricarboxylic compound, which is preferably an anhydride such as tricarballylic anhydride. The ratio of anhydride groups in the tricarboxylic compound to hydroxy groups in the hydroxyl-functional polymer can for example be 1.5:1 to 4:1.

A preferred type of hydroxy component (B) is an addition copolymer of Tg 0°–120° C. having pendent hydroxyl and amine groups. The amine groups are preferably tertiary amine groups. The addition polymer can for example be a copolymer containing 5 to 80 percent by weight, preferably 10 to 50 percent by weight, of units of a hydroxyalkyl ester of an olefinically unsaturated carboxylic acid such as hydroxyethyl methacrylate, hydroxyethyl acrylate, or hydroxypropyl methacrylate and 2 to 50 percent by weight, preferably 5 to 20 percent by weight, of units of a dialkylaminoalkyl acrylate or methacrylate, for example diethylaminoethyl methacrylate or dimethylaminoethyl methacrylate or of a dialkylaminoalkyl-substituted amide such as dimethylaminopropyl methacrylamide. The amine groups can alternatively be secondary amine groups particularly if these are linked to a tertiary alkyl group; for example the addition copolymer may be a copolymer of a hydroxyalkyl acrylate or methacrylate and t-butylaminoethyl methacrylate. Alternatively, tertiary or secondary amine groups can be introduced into an acrylic resin by copolymerising glycidyl acrylate or methacrylate with the unsaturated hydroxyalkyl ester and subsequently reacting all or part of the glycidyl groups with a secondary or primary amine. The hydroxy component (B) suitably contains 2 to 50, preferably 5 to 20 percent by weight of the resulting modified units. The addition polymer generally contains one or more comonomers which do not have reactive functional groups, for example an acrylic ester such as methyl methacrylate, ethyl methacrylate or ethyl acrylate, or styrene. Such addition polymers can be used in the powder coating composition with any of the anhydride or acid-functional components (A) described above.

The addition polymer can be a grafted copolymer of acrylic monomers, including a hydroxy-functional monomer and an amine-functional monomer, onto an unsaturated polyester. The polyester segment is preferably of low molecular weight formed from the glycol and polycarboxylic acid and/or anhydride reagents described above and including an unsaturated acid or anhydride such as maleic anhydride or itaconic acid.

An alternative type of hydroxy- and amine-functional resin of Tg 0°–120° C. suitable for use as component (B) can be prepared by the reaction of an epoxy resin and an amine. The epoxy resin can for example be a condensed glycidyl ether of bisphenol A such as that sold under the trade mark "Epikote 1004", an epoxy novolac resin or a cycloaliphatic diepoxide. The product of the epoxy resin and amine contains hydroxy and amine groups according to the following reaction:

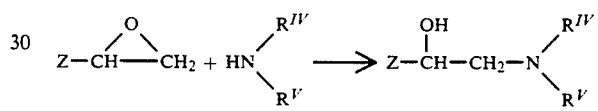

where Z is the residue of the epoxy resin, $R^{IV}$ is an organic group linked to the nitrogen atom through a carbon-nitrogen bond, preferably an alkyl or hydroxyalkyl group, and $R^V$ is hydrogen or an organic group linked to the nitrogen atom through a carbon-nitrogen bond or $R^{IV}$ and $R^V$ are such organic groups joined to form a heterocyclic ring. The amine is preferably a secondary amine and preferably contains at least one hydroxyalkyl group, for example N-methylethanolamine, N-ethylethanolamine or diethanolamine, to introduce further hydroxyl groups. Such epoxy resin/amine adducts are preferably used in the powder coating composition with a synthetic resin containing anhydride groups, for example an anhydride-tipped polyester.

A further example of a polymer of Tg 0°–120° C. suitable for use as hydroxy component (B) is a hydroxy-functional polyester modified to contain amine groups, preferably tertiary amine groups. Such a polyester may be prepared by reacting an excess of one or more glycols with a polycarboxylic acid and/or anhydride component. The glycols used in preparing the polyester are preferably of the same type as described above in connection with anhydride-functional polyesters. The polycarboxylic acid and/or anhydride component preferably consists at least partly of aromatic dicarboxylic acid or anhydride as described above and also includes an olefinically unsaturated dicarboxylic acid. The hydroxy-functional polyester thereby formed contains double bonds from the unsaturated dicarboxylic acid. Amine groups can be introduced by a Michael-type addition to the double bond. For example, a polyester containing itaconic acid residues can be reacted with a secondary amine to introduce tertiary amine groups according to the following reaction:

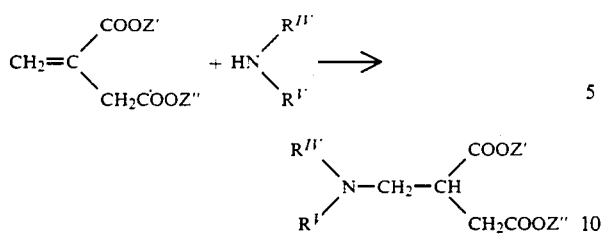

where $Z'$ and $Z''$ represent polymer residues and $R^{IV}$ and $R^V$ are defined as above. The amine is preferably a secondary amine to introduce tertiary amine groups into the polymers, for example diethylamine, di-n-propylamine, di-n-butylamine, N-methylethanolamine, N-ethylethanolamine or diethanolamine. The use of an aminoalcohol such as N-methylethanolamine or diethanolamine introduces further hydroxy groups into the polyester as well as tertiary amine groups.

In an alternative method of forming a hydroxy- and amine-functional polyester an unsaturated carboxy-functional polyester is formed by reacting a minor proportion of an unsaturated monocarboxylic acid such as acrylic or methacrylic acid with the glycol and polycarboxylic acid and/or anhydride reagents. The acrylic or methacrylic residue is incorporated at the end of the polymer chain and can be reacted with an aminoalcohol by the Michael-type addition reaction described above, preferably with a di(hydroxyalkyl)amine such as diethanolamine, to introduce hydroxy and amine groups.

The hydroxy-functional polyesters of Tg 0°-120° C. containing amine groups are preferably used in powder coating compositions with a low molecular weight anhydride component (A) such as tricarballylic anhydride or with an addition copolymer containing anhydride groups along its chain.

Examples of solid, low molecular weight compounds containing at least two hydroxy groups and at least one amino group which can be used as hydroxy component (B) when the anhydride component (A) is a resin of Tg 0°-120° C., for example an anhydride-tipped polymer, include tertiary carbinamines of the formula:

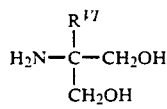

where $R^{VI}$ represents a methyl group or a hydroxyalkyl group having 1 to 4 carbon atoms, for example tris(hydroxymethyl)-methylamine or 2-amino-2-methyl-propane-1,3-diol. The corresponding secondary and tertiary amines in which the amine nitrogen atom is substituted, for example with a methyl group or a hydroxyethyl group, can also be used. Alternative hydroxy amines are the reaction products of glycidol with a diamine, particularly a heterocyclic diamine such as piperazine. The reaction product of glycidol and piperazine is a bis(dihydroxyalkyl) amine of the formula:

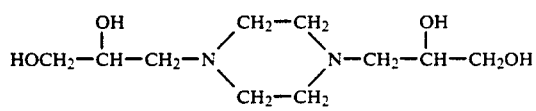

The amine groups in the hydroxy component (B) are most preferably tertiary amine groups, although primary or secondary amine groups adjacent to a tertiary carbon atom are also preferred, particularly when lower molecular weight amino alcohols such as the tertiary carbinamines described above are used.

The powder coating compositions can be formulated using known methods. The components (A) and (B) are generally mixed in the dry state together with any other ingredients of the coating composition such as pigments or fillers. The dry mixture is then extruded at a temperature above the glass transition temperature of at least one synthetic resin component but below the temperature at which substantial fusion takes place, for example at a temperature in the range 80° to 120° C. The extrudate is comminuted to form the powder coating composition, which is then applied to the substrate to be coated, which may or may not be preheated, preferably by electrostatic spraying. The coated substrate is then heated to a temperature, usually in the range 120° to 220° C., at which the synthetic resin component of the powder coating flows and the coating cures.

The components (A) and (B) are preferably used in relative proportions to provide from about one hydroxy group per carboxylic acid group to about one hydroxy group per carboxylic anhydride group ±10%.

The powder coating can for example be applied to steel pipelines, office furniture, motor car components, reinforcing bars for concrete or aluminum window frames.

Whilst any synthetic resin used as a component in the powder coating composition can generally have a Tg in the range 0°-120° C., special precautions such as low-temperature grinding and storage are required if the Tg is near the lower end of this range. The Tg of any synthetic resin used in the powder coating composition is preferably 25°-110° C. and most preferably 40°-90° C.

The powder coatings of the invention are capable of forming cured films with particularly good gloss and weathering properties such as resistance to sunlight, particularly when the anhydride component (A) and hydroxy component (B) are acrylic polymers or when a hydroxy-functional acrylic polymer (B) is used with a tricarboxylic compound such as tricarballylic anhydride as component (A). The presence of amine groups in the hydroxy-functional components (B) allows curing at lower temperature. For example, a powder coating containing an acrylic polymer containing hydroxyl and amine groups and an anhydride-functional component (A) will cure to a hard solvent-resistant coating at 170° C., whereas if an acrylic polymer containing hydroxyl groups but no amine groups is used there is insufficient curing at 170° C.

The invention is illustrated by the following Examples.

EXAMPLE 1

(a) Preparation of Tricarballylic Anhydride

Tricarballylic acid was prepared by the method of Clarke and Murray (Org. Synth. Coll. Vol. 1, P.523). Tricarballylic acid (580 g) was mixed with acetic anhydride (679 g), acetic acid (1779 g) and chloroform (2834 g) and the mixture stirred at reflux for 4.5 hours and allowed to cool. The precipitate which formed after 32 hours was collected, dried in vacuo below 110° C., and dissolved in 10 times its weight of a crystallisation mixture comprising chloroform (1000 parts), glacial acetic acid (900 parts) and acetic anhydride (100 parts), premixed at least 12 hours before use. The solution was filtered and allowed to cool. The white precipitate which formed within 36 hours was collected and dried in vacuo below 100° C.

210 g of material containing 90 per cent of tricarballylic anhydride, the residue being principally tricarballylic acid, was obtained. Analysis was by gas chromatography of the silanised product.

(b) Preparation of Hydroxy - and Amine-Functional Acrylic Polymer

Methyl methacrylate (2650 g), ethyl acrylate (600 g), hydroxyethyl acrylate (315 g), diethylaminoethyl methacrylate (500 g), methyl isobutyl ketone (MIBK) (783 g) and azobisisobutyronitrile (AZBN) (160 g) were mixed, filtered and pumped over 4 hours into a further 3000 g of MIBK refluxing at about 112° C. in a reaction vessel equipped with stirrer, thermometer and reflux condenser. One hour after addition was complete, a further 4 g of AZBN dissolved in 225 g of MIBK was added, the mixture held at reflux for one hour, and a further "booster" of the same composition added.

After a further hour, solvent was distilled off under vacuum to yield a glassy resin of cone and plate viscosity 3.5 poise (0.35 Pas) at 200° C., Tg 40° C., molecular weight 6000 by g.p.c. and hydroxyl equivalent weight 1560.

(c) Powder Coating Compositions

The acrylic polymer prepared in Example 1(b) ground to a coarse powder (606.1 g), tricarballylic anhydride (31.9 g), rutile titanium dioxide (350 g), Modaflow 3 (Trade Mark) acrylic polymer flow promoting agent (10 g), and benzoin (2 g) were premixed and coextruded at 80° C. The extrudate was micronised to a powder of average particle size 50 microns, electrostatically sprayed onto steel panels and stoved for 15 minutes at 170° C. The films obtained were glossy, hard and crosslinked, resisting rubbing with an acetone-soaked cloth.

EXAMPLE 2

(a) Preparation of Anhydride-Functional Polyester

Isophthalic acid (1992 g), adipic acid (584 g), pentaerythritol (136 g), neopentyl glycol (1664 g) and xylene (75 g) were charged to a reaction vessel fitted with stirrer, condenser and thermometer, and heated to reflux. After about 12 hours, the temperature had risen to 240° C., 500 g of water had been removed and the acid value fallen to 10. Xylene was removed by distillation in vacuo, and replaced by MIBK (150 g). Tricarballylic anhydride (894 g) was charged at 120° C., and the temperature maintained for 12 hours, ensuring only gentle reflux. A Dean and Starke trap was then fitted and vigorous refluxing to remove water continued for 4 hours. Solvent was removed in vacuo to yield a glassy polymer of anhydride equivalent weight approx. 1000, Tg 50° C. and viscosity 40 poise (4 Pas) at 200° C.

(b) Preparation of Powder Coatings

The anhydride-functional polyester prepared in (a) above (1000 g), tris(hydroxymethyl)methylamine (40 g), TiO₂ (1350 g), Modaflow 3 (10 g) and benzoin (2 g) were mixed, extruded at 100° C., and micronised, sprayed and stoved as described in Example 1 to yield hard, tough coatings.

EXAMPLE 3

(a) Preparation of Hydroxy-Functional Acrylic Polymer

The procedure of Example 1(b) was repeated exactly, except that the monomer mixture comprised only methyl methacrylate (2850 g), ethyl acrylate (900 g) and hydroxyethyl acrylate (315 g) to prepare an amine-free polymer. The product had a viscosity of 4 poise (0.4 Pas) at 200° C., Tg 45° C., molecular weight 8000 by g.p.c., and hydroxyl equivalent weight of 1560.

(b) Preparation of Anhydride-Functional Acrylic Polymer

The amine-free hydroxyacrylic polymer (1560 g), tricarballylic anhydride (182 g) and MIBK (87 g) were stirred together at 120° C. with reflux for 16 hours. A Dean and Starke trap was then fitted, and vigorous reflux continued for 2 hours. The product was then dried in vacuo to a glassy brittle anhydride-functional resin.

(c) Preparation of Powder Coating

The anhydride-functional resin of Example 3(b) (875 g), tris(hydroxymethyl)-methylamine (20 g) TiO₂ (350 g), Modaflow 3 (10 g) and Benzoin (2 g) were mixed, coextruded, micronised, sprayed, and stoved as described in Example 1(c) to yield hard, cured coatings.

EXAMPLE 4

The anhydride-functional polymer of Example 3(b) (1750 g) was mixed with the hydroxy- and amine-functional acrylic polymer of Example 1(b) (1560 g), TiO₂ (1815 g), Modaflow 3 (52 g) and benzoin (10 g) and co-extruded, micronised, sprayed, and stoved as described in Example 1(c) to form a hard, solvent-resistant coating.

EXAMPLE 5

(a) Preparation of Anhydride Component

The amine-free hydroxyacrylic polymer of Example 3(a) (1560 g), tricarballylic anhydride (33.0 g) and MIBK (95 g) were refluxed together for 8 hours, followed by in vacuo drying below 120° C. The product was a mixture of anhydride-functional acrylic polymer and tricarballylic anhydride, both components active in curing.

(b) Preparation of Powder Coating

The anhydride component prepared in Example 5(a) (950 g) was mixed with the hydroxy- and amine-functional acrylic polymer of Example 1(b) (1560 g), TiO₂ (1375 g), Modaflow 3 (40 g) and benzoin (8 g) and extruded, micronised, sprayed and stoved as described in Example 1. A hard, smooth cured film was obtained.

EXAMPLE 6

The hydroxy and amine-functional polymer of Example 1(b) (606.1 g) was mixed with tricarballylic acid (34.2 g) and pigments and additives and formed into a powder coating and applied as described in Example 1(c).

COMPARATIVE EXAMPLE

The procedure of Example 1(c) was repeated using the amine-free hydroxy-functional acrylic polymer of Example 3(a) in place of the polymer of Example 1(b).

The films produced were uncured and of poor appearance (low gloss).

I claim:

1. A powder coating composition comprising a solid polymer (A) containing at least two cyclic carboxylic anhydride groups per molecule and a solid addition copolymer (B) of glass transition temperature 0° to 120° C. having pendent hydroxyl and amine groups, said amine groups catalysing the reaction of the carboxylic anhydride groups of polymer (A) with the hydroxyl groups of polymer (B), provided that if the polymer (A) is an addition polymer, the carboxylic anhydride groups are separated from the addition polymer chain by at least one intervening carbon atom.

2. A process for coating a substrate comprising applying a thermosetting powder coating composition to the substrate to form a layer and heating the composition on the substrate to fuse at least one reactive component of the composition to cause it to flow and to react with another component to cure the composition, wherein the powder coating composition is a composition according to claim 1.

3. A powder coating composition according to claim 1 wherein the polymer (A) is the reaction product of a hydroxy-functional polymer with a compound containing a moiety of the formula:

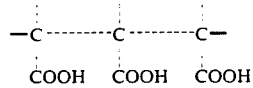

under conditions of heating effective to introduce anhydride groups and has a glass transition temperature of 0° to 120° C.

4. A powder coating composition according to claim 1 wherein the polymer (A) is the reaction product of an addition copolymer having pendent hydroxy groups with a compound containing a moiety of the formula:

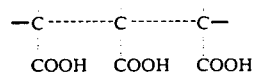

under conditions of heating effective to introduce anhydride groups.

5. A powder coating composition according to claim 1, wherein the polymer (A) is an anhydride-tipped polymer having a glass transition temperature of 0° to 120° C.

6. A powder coating composition according to claim 5, wherein the polymer (A) is the reaction product of a hydroxy-functional polymer with a tricarboxylic compound capable of introducing anhydride groups and has a glass transition temperature of 0°-120° C.

7. A powder coating composition according to claim 6, wherein the polymer (A) is the reaction product of an addition copolymer having pendent hydroxyl groups with a tricarboxylic compound capable of introducing anhydride groups.

8. A powder coating composition according to claim 7, wherein the hydroxy component (B) is an addition copolymer of glass transition temperature 0°–120° C. having pendent hydroxyl and amine groups.

9. A powder coating composition comprising a component (A) containing carboxylic anhydride functionality and a component (B) containing hydroxy functionality, the components (A) and (B) both being solids at temperatures up to 50° C. and at least one of (A) and (B) being a synthetic resin having a glass transition temperature in the range 0°-120° C. wherein the carboxylic anhydride-functional component (A) is a polymer containing at least two cyclic carboxylic anhydride groups per molecule and is the reaction product of a hydroxyfunctional polymer with a tricarboxylic compound capable of introducing anhydride groups, provided that the carboxylic anhydride-functional (A) does not contain an olefinically unsaturated double bond in the alpha, beta- or beta, gamma-position with respect to any carboxylic anhydride group and provided that if the component (A) is an addition polymer the carboxylic anhydride groups are separated from the addition polymer chain by at least one intervening carbon atom, and wherein the hydroxy-functional component (B) is an addition copolymer containing at least two pendent hydroxy groups per molecule and containing at least one pendent amine group in its molecule to catalyse the reaction of the carboxylic anhydride group of component (A) with the hydroxy groups of component (B).

10. A powder coating composition comprising a component (A) containing carboxylic anhydride functionality and a component (B) containing hydroxy functionality, the components (A) and (B) both being solids at temperatures up to 50° C. and at least one of (A) and (B) being a synthetic resin having a glass transition temperature in the range 0°-120° C., wherein the carboxylic anhydride-functional component (A) is a polymer containing at least two cyclic carboxylic anhydride groups per molecule and is the reaction product of an addition copolymer having pendent hydroxyl groups with the compound containing a moiety of the formula:

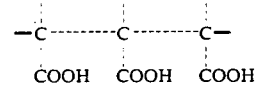

or a cyclic anhydride thereof under conditions of heating effective to introduce anhydride groups, provided that the carboxylic anhydride-functional (A) does not contain an olefinically unsaturated double bond in the alpha, beta- or beta, gamma-position with respect to any carboxylic anhydride group and provided that the carboxylic anhydride groups are separated from the addition polymer chain by at least one intervening carbon atom, and wherein the hydroxy-functional component (B) is an addition copolymer containing 10-15% by weight of units of a hydroxy-alkyl ester of an olefinically unsaturated carboxylic acid and 5-20% by weight of units of a dialkylaminoalkyl ester or (tertiary alkyl)-aminoalkyl-ester of an olefinically unsaturated carboxylic acid or a dialkylaminoalkyl-substituted amide of an olefinically unsaturated carboxylic acid.

11. A powder coating composition comprising a component (A) containing carboxylic anhydride functionality and a component (B) containing hydroxy functionality, the components (A) and (B) both being solids at temperatures up to 50° C., wherein
  the carboxylic anhydride-functional component (A) is a polymer containing at least two cyclic carboxylic anhydride groups per molecule
  provided that the carboxylic anhydride-functional component (A) does not contain an olefinically unsaturated double bond in the alpha, beta- or beta, gamma-position with respect to any carboxylic anhydride group and provided that if the component (A) is an addition polymer the carboxylic anhydride groups are separated from the addition polymer chain by at least one intervening carbon atom, and wherein the hydroxy-functional component (B) is a synthetic resin having a glass transition temperature in the range 0°–120° C. containing at least two hydroxy groups per molecule and containing at least one amine group in its molecule to catalyse the reaction of the carboxylic anhydride groups of component (A) with the hydroxy groups of component (B).

12. A powder coating composition according to claim 11, wherein the polymer (A) is the reaction product of a hydroxy-functional polymer with a cyclic anhydride of a compound containing a moiety of the formula:

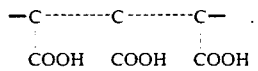

and has a glass transition temperature of 0°–120° C.

13. A powder coating composition according to claim 12, wherein the composition additionally contains an unreacted cyclic anhydride of a compound containing a moiety of the formula:

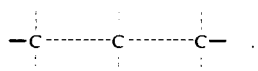

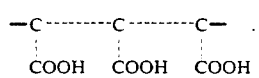

14. A powder coating composition according to claim 12, wherein the polymer (A) is the reaction product of an addition polymer having pendant hydroxyl groups with a cyclic anhydride of a compound containing a moiety of the formula:

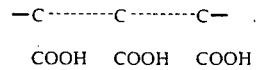

15. A powder coating composition according to claim 12, wherein the polymer (A) is the reaction product of a hydroxy-functional polyester with a cyclic anhydride of a compound containing a moiety of the formula:

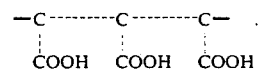

16. A powder coating composition according to claim 11, wherein the hydroxy component (B) is a hydroxy-functional polyester modified to contain amine groups and having a glass transition temperature of 0° to 120° C.

17. A powder coating composition according to claim 11, wherein the hydroxy component (B) is a reaction product of an epoxy resin and an amine and has a glass transition temperature of 0° to 120° C.

18. A powder coating composition according to claim 11, wherein the amine groups in the hydroxy component (B) are tertiary amine groups.

19. A powder coating composition according to claim 11, wherein the hydroxy component (B) is an addition copolymer of glass transition temperature 0° to 120° C. having pendent hydroxyl and amine groups.

20. A powder coating composition according to claim 19, wherein the hydroxy component (B) is an addition copolymer containing 10 to 50 percent by weight of units of a hydroxyalkyl ester of an olefinically unsaturated carboxylic acid and 5 to 20 percent by weight of units of a dialkylaminoalkyl ester or (tertiary alkyl) aminoalkyl ester of an olefinically unsaturated carboxylic acid or a dialkylaminoalkyl-substituted amide of an olefinically unsaturated carboxylic acid.

21. A powder coating composition according to claim 19, wherein the hydroxy component (B) is an addition copolymer containing 10 to 50 percent by weight of units of a hydroxyalkyl ester of an olefinically unsaturated carboxylic acid and 2 to 50 percent by weight of units of a glycidyl ester of an olefinically unsaturated carboxylic acid which have been modified by reacting the glycidyl group with a secondary or primary amine.

* * * * *